(12) United States Patent
Kim et al.

(10) Patent No.: US 12,742,091 B2
(45) Date of Patent: Sep. 22, 2026

(54) PAINT COMPOSITION HAVING IMPROVED ANTIBACTERIAL PROPERTIES FOR WATER TRANSFER PRINTING

(71) Applicants: HYUNDAI MOTOR COMPANY, Seoul (KR); KIA CORPORATION, Seoul (KR); CHO KWANG PAINT CO., LTD, Busan (KR)

(72) Inventors: Hyun Jung Kim, Seoul (KR); Ho Tak Jeon, Hwaseong-si (KR); Jae Sik Seo, Hwaseong-si (KR); Ji Hwan Park, Anseong-si (KR); Dae Joung Cho, Daeso-myeon (KR)

(73) Assignees: HYUNDAI MOTOR COMPANY, Seoul (KR); KIA CORPORATION, Seoul (KR); CHO KWANG PAINT CO., LTD, Busan (KR)

( * ) Notice: Subject to any disclaimer, the term of this patent is extended or adjusted under 35 U.S.C. 154(b) by 599 days.

(21) Appl. No.: 18/141,061

(22) Filed: Apr. 28, 2023

(65) Prior Publication Data

US 2024/0117211 A1 Apr. 11, 2024

(30) Foreign Application Priority Data

Sep. 30, 2022 (KR) ........................ 10-2022-0124796

(51) Int. Cl.
*C09D 133/08* (2006.01)
*C08K 3/08* (2006.01)

(52) U.S. Cl.
CPC .............. *C09D 133/08* (2013.01); *C08K 3/08* (2013.01); *C08K 2003/0806* (2013.01)

(58) Field of Classification Search
CPC .................................................... C09D 133/08
See application file for complete search history.

(56) References Cited

U.S. PATENT DOCUMENTS

| | | | | |
|---|---|---|---|---|
| 2015/0079295 A1* | 3/2015 | Jeong | C09D 167/02 | |
| | | | 524/513 | |
| 2016/0194502 A1 | 7/2016 | Gisser et al. | | |
| 2017/0174929 A1* | 6/2017 | Jeon | C09D 175/06 | |

FOREIGN PATENT DOCUMENTS

| | | | | |
|---|---|---|---|---|
| CN | 106084983 | A | | 11/2016 |
| CN | 108065788 | A | | 5/2018 |
| CN | 111910463 | A | | 11/2020 |
| CN | 113242889 | A | | 8/2021 |
| CN | 113372801 | A | | 9/2021 |
| IN | 111440421 | A | | 7/2020 |
| JP | 62-192472 | A | | 8/1987 |
| JP | 2004026841 | A | * | 1/2004 |
| JP | 2011207953 | A | * | 10/2011 |

(Continued)

OTHER PUBLICATIONS

English machine translation of Teratani (JP 2011-207953) (Year: 2011).*

(Continued)

*Primary Examiner* — Michael F Pepitone
(74) *Attorney, Agent, or Firm* — MCDONNELL BOEHNEN HULBERT & BERGHOFF LLP

(57) ABSTRACT

A paint composition is prepared by mixing each of an acrylic resin, an acrylic polyol resin, a polycarbonate diol resin, a diisocyanate, a solvent, and an antibacterial agent in appropriate amounts. As a result, the paint composition has improved physical properties and effective antibacterial activities.

19 Claims, 3 Drawing Sheets

(56) References Cited

FOREIGN PATENT DOCUMENTS

| | | | |
|---|---|---|---|
| KR | 1998-0002171 | | 3/1998 |
| KR | 2009-0038269 | A | 4/2009 |
| KR | 2012-0021739 | A | 3/2012 |
| KR | 2016-0141432 | A | 12/2016 |
| KR | 20200017992 | A | 2/2020 |

OTHER PUBLICATIONS

English machine translation of Kimura et al. (JP 2004-26841) (Year: 2004).*

* cited by examiner

PAINT COMPOSITION HAVING IMPROVED ANTIBACTERIAL PROPERTIES FOR WATER TRANSFER PRINTING

CROSS REFERENCE TO RELATED APPLICATIONS

The present application claims priority to Korean Patent Application No. 10-2022-0124796, filed Sep. 30, 2022, the entire contents of which is incorporated herein for all purposes by this reference.

BACKGROUND

1. Field of the Disclosure

The present disclosure relates to a paint composition for water transfer printing.

2. Description of the Related Art

A water transfer printing method is implemented in the order of color painting, film coating, and clear painting on an injection product (a substrate: acrylonitrile butadiene styrene (ABS), polycarbonate (PC)/ABS, and the like). The water transfer printing method realizes simplicity of the process, in addition to pattern diversification based on the degree of freedom in printing (capable of realizing various colors and patterns, for example, real material copying). In addition, in the water transfer printing method, a mold is unnecessary for molding, unlike in film molding. As a result, there are advantages of cost reduction, increased degree of freedom in shape implementation, and the like.

Recently, with increasing interest in hygiene, in the industrial fields of vehicles and personal electronic devices such as mobile phones, laptop computers, tablet PCs, which are prone to bacterial contamination, the development of products having antibacterial properties has increased. This is because various pathogens (microorganisms) such as *Escherichia coli* or *Staphylococcus*, which are harmful to the human body, may be produced or grow from foreign substances being in contact with skin through cosmetic products as well as moisture, hand marks, or oil from the human body. When the above products are in contact with the skin, the above bacteria may cause various diseases. As a result, the situation is that products having antibacterial properties are required to be developed in environments in which microorganisms are likely to thrive due to contamination caused when being in contact with human hands or through the external environment in the decorative parts for vehicles.

SUMMARY

The present disclosure is to solve such a problem, and an object of the present disclosure is to provide a paint composition having improved antibacterial properties. In addition, the paint composition makes up for changes in appearance, such as discoloration in the coating containing existing antibacterial agent, and deterioration in antibacterial properties after durability evaluation.

Objectives of the present disclosure are not limited to the objectives mentioned above. The above and other objectives of the present disclosure will become more apparent from the following description, and will be realized by the means of the appended claims, and combinations thereof.

A paint composition, according to the present disclosure, may include an acrylic resin, an acrylic polyol resin, a polycarbonate diol resin, a diisocyanate, a solvent, and an antibacterial agent.

The paint composition may include 1% to 10% by weight of the acrylic resin, 20% to 50% by weight of the acrylic polyol resin, 1% to 10% by weight of the polycarbonate diol resin, 15% to 25% by weight of the diisocyanate, 21% to 60% by weight of the solvent, and 2% to 5% by weight of the antibacterial agent.

The acrylic resin, according to the present disclosure, may have a solid content of about 35% to 45% by weight and a glass transition temperature (Tg) in a range of 50° C. to 90° C.

The acrylic polyol resin, according to the present disclosure, may include 10% to 25% by weight of a first acrylic polyol resin and 10% to 25% by weight of a second acrylic polyol resin, with respect to a total weight of the entire paint composition.

The first acrylic polyol resin, according to the present disclosure, may have a solid content of about 55% to 65% by weight and a hydroxyl value in a range of 15% to 60% and a glass transition temperature in a range of 30° C. to 70° C.

The second acrylic polyol resin, according to the present disclosure, may have a solid content of about 45% to 55% by weight and a hydroxyl value in a range of 10% to 50% and a glass transition temperature in a range of 20° C. to 60° C.

The polycarbonate diol resin, according to the present disclosure, may have a solid content of about 90% to 100% by weight and a hydroxyl value in a range of 1% to 10% and a weight average molecular weight (Mw) in a range of 100 to 2000.

The diisocyanate, according to the present disclosure, may have a solid content of about 90% to 100% by weight and NCO in a range of 15% to 25%.

The solvent, according to the present disclosure, may include at least one type selected from the group consisting of a ketone-based solvent, an acetate-based solvent, and combinations thereof.

The solvent, according to the present disclosure, may include 1% to 10% by weight of the ketone-based solvent and 20% to 50% by weight of the acetate-based solvent, with respect to the total weight of the entire paint composition.

The antibacterial agent, according to the present disclosure, may be an inorganic antibacterial agent.

The antibacterial agent, according to the present disclosure, may contain at least one metal selected from the group consisting of magnesium (Mg), zinc (Zn), silver (Ag), calcium (Ca), phosphorus (P), lead (Pb), and combinations thereof.

The antibacterial agent, according to the present disclosure, may include a support and a metal supported on the support, and the metal may be silver (Ag), and the support may include at least one type selected from the group consisting of a glass-based support, a zeolite-based support, a zirconium-based support, and combinations thereof.

The antibacterial agent, according to the present disclosure, may include 0.01% to 5% by weight of silver (Ag) with respect to a total weight of the entire antibacterial agent.

The antibacterial agent, according to the present disclosure, may have a solid content of about 30% to 50% by weight.

The antibacterial agent, according to the present disclosure, may have an average particle size in a range of 1.1 μm to 1.5 μm.

The paint composition, according to the present disclosure, may further include an additive selected from the group consisting of a curing accelerator, an ultraviolet stabilizer, a surface modifier, and combinations thereof.

The additive, according to the present disclosure, may include 0.1% to 1% by weight of the curing accelerator, 0.1% to 3% by weight of the ultraviolet stabilizer, and 0.1% to 1% by weight of the surface modifier, with respect to 100% by weight of the entire paint composition.

The paint composition, according to the present disclosure, may further include a quencher.

The quencher, according to the present disclosure, may include synthetic amorphous silica having an average particle size in a range of 1.0 μm to 2.0 μm.

A paint composition, according to the present disclosure, may have improved durability (heat resistance, moisture resistance, and light resistance) and antibacterial properties.

The paint composition, according to the present disclosure, can be used to meet the needs of various designers regarding gloss by adjusting a quencher in an appropriate amount. In addition, even with the added quencher, good physical properties can be still obtained.

Effects of the present disclosure are not limited to the effects mentioned above. It should be understood that the effects of the present disclosure include all effects which can be deduced from the following description.

DETAILED DESCRIPTION

Figure 1:
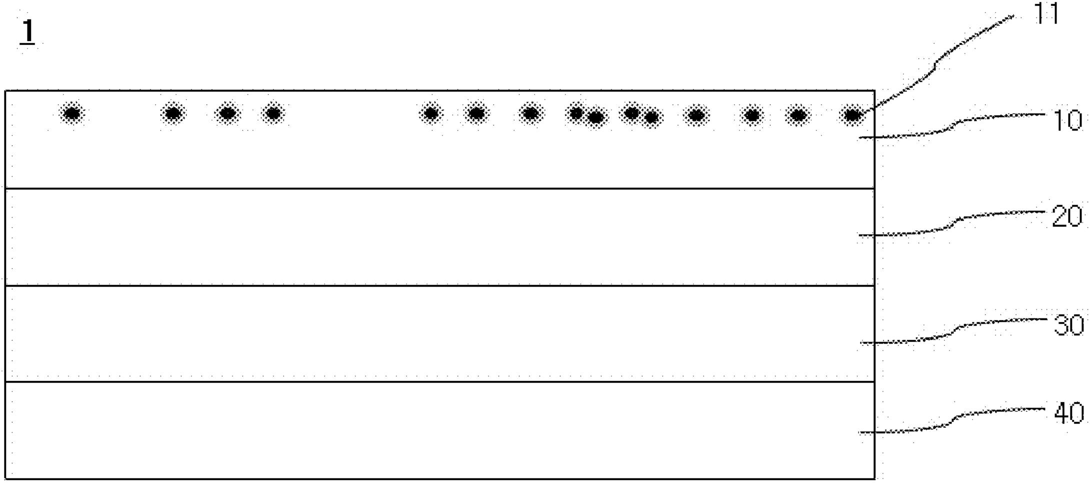
FIG. 1 illustrates a water transfer printed layer according to an embodiment of the present disclosure.

Above objectives, other objectives, features, and advantages of the present disclosure will be readily understood from the following preferred embodiments associated with the accompanying drawings. However, the present disclosure is not limited to the embodiments described herein and may be embodied in other forms. The embodiments described herein are provided so that the disclosure can be made thorough and complete and that the spirit of the present disclosure can be fully conveyed to those skilled in the art. Throughout the drawings, like elements are denoted by like reference numerals. In the accompanying drawings, the dimensions of the structures are larger than actual sizes for clarity of the present disclosure. Terms used in the specification, "first", "second", etc., may be used to describe various components, but the components are not to be construed as being limited to the terms. These terms are used only for the purpose of distinguishing a component from another component. For example, without departing from the scope of the present disclosure, a first component may be referred as a second component, and a second component may be also referred to as a first component. The singular expression includes the plural expression unless the context clearly indicates otherwise. It will be further understood that the terms "comprises", "includes", or "has" when used in this specification specify the presence of stated features, regions, integers, steps, operations, elements and/or components, but do not preclude the presence or addition of one or more other features, regions, integers, steps, operations, elements, components and/or combinations thereof. It will also be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween. Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

A paint composition, according to the present disclosure, may include an acrylic resin, an acrylic polyol resin, a polycarbonate diol resin, a diisocyanate, a solvent, and an antibacterial agent.

Hereinafter, each component constituting the paint composition of the present disclosure will be described in detail.

Acrylic Resin

The acrylic resin, according to the present disclosure, is characterized in that the adhesion to the acrylic polyol resin is good, and the drying properties are improved. In some embodiments, the drying properties are excellent.

The acrylic resin is a commonly used acrylic resin and refers to a dendritic material obtained by polymerizing acrylic acid, methacrylic acid, or a monomer having an esterified product with peroxide, heat, or ultraviolet rays. The properties of the acrylic resin are determined by the type of the monomer, polymerization conditions, degree of polymerization, branching, and the like. In addition, the acrylic resin is classified as a thermosetting resin or a thermoplastic resin according to the presence of a polar group in the acrylic resin. The acrylic resin of the present disclosure is the thermosetting acrylic resin. By using the acrylic monomer having functionality such as amide, carboxyl, hydroxyl, epoxy, and the like, the acrylic resin is inert at room temperature. However, there is an advantage in that the acrylic resin can be easily cross-linked by mixing a catalyst or curing agent, or heating.

The acrylic resin may has a solid content of about 35% to 45% by weight, with respect to a total weight of the entire acrylic resin. In this case, when the solid content of the acrylic resin is less than 35% by weight, adhesion to a substrate may be unstable. In addition, when the solid content of the acrylic resin exceeds 45% by weight, there may be a limitation in adjusting the proper viscosity of the paint, and paint workability may be low.

The acrylic resin may have a glass transition temperature (Tg) in a range of 50° C. to 90° C. In this case, when the glass transition temperature of the acrylic resin is lower than 50° C., a paint film may have low hardness, thereby having low scratch resistance. In addition, when the glass transition temperature of the acrylic resin is higher than 90° C., the hardness may be excessively high, so the paint film may be broken.

According to the present disclosure, the paint composition preferably includes 1% to 10% by weight of the acrylic resin. In this case, when the content of the acrylic resin is less than 1% by weight, adhesion and appearance quality may be deteriorated. In addition, when the content of the acrylic resin exceeds 10% by weight, flowability may be reduced, thereby reducing workability.

Acrylic Polyol Resin

The acrylic polyol resin, according to the present disclosure, is characterized in that the appearance quality and workability are improved, and in some embodiments excellent, and the cross-linking density is high, thereby having improved, and in some embodiments excellent, physical properties.

The acrylic polyol resin is a polymer obtained by copolymerizing an acrylic monomer having a hydroxyl group (—OH), a styrene monomer, and the like. Generally, the acrylic polyol resin can be prepared through a solution polymerization process of an acrylic monomer containing various polymerizable monomers and the hydroxyl group in the presence of a radical polymerization initiator. The physical properties of the paint composition including the acrylic polyol resin are influenced by the type of the acrylic monomer, composition ratios, molecular weight, and hydroxyl value. In addition, such a paint composition has excellent quick-drying properties, weather resistance, chemical resistance, mechanical properties, and the like.

The acrylic polyol resin may include a first acrylic polyol resin and a second acrylic polyol resin.

The first acrylic polyol resin may has a solid content of about 55% to 65% by weight, with respect to a total weight of the first acrylic polyol resin. In this case, when the solid content of the first acrylic polyol resin is less than 55% by weight, gloss and leveling may be deteriorated, thereby deteriorating basic physical properties. In addition, when the solid content of the first acrylic polyol resin exceeds 60% by weight, paint workability may be low due to a limitation in adjusting proper viscosity of the paint.

The first acrylic polyol resin may have a hydroxyl value in a range of 15% to 60%. In this case, when the hydroxyl value content of the first acrylic polyol resin is less than 15%, overall physical properties of the paint film may be deteriorated due to insufficient chemical bonds during a curing reaction. In addition, when the hydroxyl value content of the first acrylic polyol resin exceeds 60%, there may be a problem with storage and expense since a large amount of a curing agent is required.

The first acrylic polyol resin may have a glass transition temperature (Tg) in a range of 30° C. to 70° C. In this case, when the glass transition temperature of the first acrylic polyol resin is lower than 30° C., the paint film may have low hardness, thereby having low scratch resistance. In addition, when the glass transition temperature of the first acrylic polyol resin is higher than 70° C., the hardness may be excessively high, so the paint film is broken.

The second acrylic polyol resin may has a solid content of about 45% to 55% by weight, with respect to a total weight of the second acrylic polyol resin. In this case, when the solid content of the second acrylic polyol resin is less than 45% by weight, gloss and leveling may be deteriorated, thereby deteriorating basic physical properties. In addition, when the solid content of the second acrylic polyol resin exceeds 55% by weight, there may be a limitation in adjusting proper viscosity of the paint, and paint workability may be low.

The second acrylic polyol resin may have hydroxyl value in a range of 10% to 50%. In this case, when the hydroxyl value content of the second acrylic polyol resin is less than 10%, overall physical properties of the paint film may be deteriorated due to insufficient chemical bonds during a curing reaction. In addition, when the hydroxyl value content of the second acrylic polyol resin exceeds 50%, there may be a problem with storage and expense since a large amount of a curing agent is required.

The second acrylic polyol resin may have a glass transition temperature (Tg) in a range of 20° C. to 60° C. In this case, when the glass transition temperature of the second acrylic polyol resin is lower than 20° C., the paint film may have low hardness, thereby having low scratch resistance. In addition, when the glass transition temperature of the second acrylic polyol resin is higher than 60° C., the hardness may be excessively high, so the paint film may be broken.

The acrylic polyol resin may include 10% to 25% by weight of the first acrylic polyol resin and 10% to 25% by weight of the second acrylic polyol resin, with respect to 100% by weight of the entire composition.

According to the present disclosure, the paint composition preferably includes 20% to 50% by weight of the acrylic polyol resin. In this case, when the content of the acrylic polyol resin is less than 20% by weight, gloss and leveling may be deteriorated, thereby deteriorating basic physical properties. In addition, when the content of the acrylic polyol resin exceeds 50% by weight, paint workability may be low due to a limitation in adjusting proper viscosity of the paint.

Polycarbonate Diol Resin

The polycarbonate diol resin, according to the present disclosure, is heat resistant and moisture resistant. As a result, the polycarbonate diol resin is characterized in that the heat resistance and moisture resistance are improved, and in some embodiments excellent, and the molecular weight is high. In addition, the polycarbonate diol resin has the advantages of high viscosity and slow-drying properties.

The polycarbonate diol resin is preferably polyalkylene carbonate diol.

The polycarbonate diol resin may has a solid content of about 90% to 100% by weight, with respect to a total weight of the polycarbonate diol resin.

The polycarbonate diol resin may have a hydroxyl value in a range of 1% to 10%.

The polycarbonate diol resin may have a weight average molecular weight (Mw) in a range of 100 to 10000, preferably the range of 200 to 5000, and more preferably in the range of 500 to 2000. Since the polycarbonate diol resin has a high molecular weight, the viscosity thereof is high, and thus the paint dries slowly.

The paint composition preferably includes 1% to 10% by weight of the polycarbonate diol resin. In this case, when the content of the polycarbonate diol resin is less than 1% by weight, heat resistance and moisture resistance may be low. In addition, when the content of the polycarbonate diol resin exceeds 10% by weight, the paint may dry slowly.

Diisocyanate

The diisocyanate, according to the present disclosure, may be used as a curing agent.

The diisocyanate may include at least one selected from the group consisting of isophorone diisocyanate hexamethylene diisocyanate, methylcyclohexane diisocyanate, xylene diisocyanate, diphenylmethane diisocyanate, 1,5-naphthalene diisocyanate, 2,4-toluene diisocyanate, 2,6-toluene diisocyanate, and combinations thereof.

The diisocyanate, according to the present disclosure, may have a solid content of about 90% to 100% by weight NCO in a range of 15% to 25%.

The paint composition preferably includes 15% to 25% by weight of the diisocyanate. In this case, when the content of the diisocyanate is less than 15% by weight, polyurethane may be insufficiently synthesized. In addition, when the content of the diisocyanate exceeds 25% by weight, there may be a problem in that the unreacted organic diisocyanate remains.

Solvent

The solvent, according to the present disclosure, may include at least one selected from the group consisting of a ketone-based solvent, an acetate-based solvent, and combinations thereof.

The ketone-based solvent may include at least one selected from the group consisting of methyl isobutyl ketone, methyl ethyl ketone, cyclohexanone, and combinations thereof. The acetate-based solvent may include at least one selected from the group consisting of ethyl acetate, butyl acetate, isobutyl acetate, and combinations thereof.

The solvent may include 1% to 10% by weight of the ketone-based solvent and 20% and 50% by weight of the acetate-based solvent.

According to the present disclosure, the paint composition preferably includes 21% to 60% by weight of the solvent. In this case, when the content of the solvent is less than 21% by weight, appearance quality may be deteriorated. In addition, when the content of the solvent exceeds 60% by weight, flowability and the solid content of the paint composition may be reduced, thereby reducing workability.

Antibacterial Agent

The antibacterial agent, according to the present disclosure, is characterized in that an inorganic antibacterial agent, which is evenly distributed on a surface of a material, adheres to a surface of bacteria and removes a cell wall while ions are dissolved. Then, the ions bonded to proteins surrounding cells, such as cell membranes and enzymes, may inhibit bacterial growth by inhibiting the energy metabolism of bacteria and changing the internal structure thereof.

The antibacterial agent may be the inorganic antibacterial agent. When the inorganic antibacterial agent is used, the immediate effect may be lower than that of an organic antibacterial agent. However, the inorganic antibacterial agent has higher human body stability and prevent resistant bacteria appearance. In addition, antibacterial duration of the inorganic antibacterial agent is nearly semi-permanent.

The antibacterial agent may include a support and a metal supported on the support. In addition, the metal may be silver (Ag), and the support may include at least one type selected from the group consisting of a glass-based support, a zeolite-based support, a zirconium-based support, and combinations thereof.

The antibacterial agent, according to the present disclosure, may include 0.01% to 5% by weight of silver (Ag), with respect to a total weight of the entire antibacterial agent. In this case, when the content of silver (Ag) exceeds 5% by weight, there may be a problem in increased price.

The paint composition preferably includes 2% to 5% by weight of the antibacterial agent. In this case, when the content of the antibacterial agent is less than 2% by weight, the antibacterial properties may not be expressed. In addition, when the content of the antibacterial agent exceeds 6% by weight, discoloration may occur after evaluating light resistance and heat resistance.

The antibacterial agent may has a solid content of about 30% to 50% by weight, with respect to the total weight of the entire antibacterial agent.

The antibacterial agent may have an average particle size in a range of 1.1 μm to 1.5 μm. In this case, when the average particle size of the antibacterial agent is smaller than 1.1 μm, there may be a problem of injecting the antibacterial agent in an excessive amount, resulting in increased manufacturing costs. In addition, when the average particle size of the antibacterial agent is larger than 1.5 μm, there may be a problem in leveling.

Additive

The paint composition, according to the present disclosure, may further include an additive selected from the group consisting of a curing accelerator, an ultraviolet stabilizer, a surface modifier, and combinations thereof.

Curing Accelerator

The curing accelerator, according to the present disclosure, has effects of enhancing drying properties and shortening curing time by accelerating curing.

The curing accelerator may include at least one selected from the group consisting of tetramethylbutanediamine, bicyclooctane, dibutyltin dilaurate, triethylamine, diethylenetriamine, triethyldiamine, zinc octoate, bismuth carboxylate, zirconium chelate, calcium octoate, and combinations thereof. Preferably, the curing accelerator is dibutyltin dilaurate.

The paint composition preferably includes 0.1% to 1% by weight of the curing accelerator. In this case, when the content of the curing accelerator is less than 0.1% by weight, drying properties and physical properties may be insignificantly enhanced. In addition, when the content of the curing accelerator exceeds 1% by weight, appearance quality may be deteriorated, and pot life may be shortened.

Ultraviolet Stabilizer

The ultraviolet stabilizer, according to the present disclosure, has a strong ultraviolet (UV) absorption ability to inhibit radical generation in the acrylic polyol resin. In addition, the ultraviolet stabilizer is effective in preventing discoloration, swelling, delamination, and loss of gloss of the acrylic polyol resin. The ultraviolet stabilizer may include at least one type selected from the group consisting of a benzotriazole-based ultraviolet stabilizer, a benzylidenehydant-based ultraviolet stabilizer, a benzophenone-based ultraviolet stabilizer, a benzoguanine-based ultraviolet stabilizer, and combinations thereof. Preferably, the hydroxyphenyl benzotriazole-based ultraviolet stabilizer is used.

The paint composition preferably includes 0.1% to 3% by weight of the ultraviolet stabilizer. In this case, when the content of the ultraviolet stabilizer exceeds 3% by weight, the increased effect of the ultraviolet stabilizer may be insufficient, considering the input amount, resulting in increased manufacturing costs.

Surface Modifier

The surface modifier, according to the present disclosure, is a leveling additive for acrylic surfaces for printing inks and oil-soluble paints having semi-polarity to polarity.

The surface modifier may be a polyacrylic-based, a polysiloxane-based, or the like.

The surface modifier may has a solid content of about 50% to 60% by weight, with respect to a total weight of the entire surface modifier.

The paint composition preferably includes 0.1% to 3% by weight of the surface modifier. In this case, when the content of the surface modifier is less than 0.1% by weight, appearance quality may be insignificantly improved. In addition, when the content of the surface modifier exceeds 3% by weight, adhesion may be low.

Quencher

A quencher, according to the present disclosure, has an effect of changing gloss of appearance. Therefore, the quencher may be added in a different amount depending on the desired gloss of appearance.

The quencher may include synthetic amorphous silica.

The quencher may have an average particle size in a range of 1.0 μm to 2.0 μm.

The paint composition preferably includes 0.1% to 10% by weight of the quencher. In this case, when the content of the quencher exceeds 10% by weight, paint workability may be low due to a limitation in adjusting proper viscosity of the paint.

Hereinafter, the present disclosure will be described in detail with reference to the following Example and Comparative Examples. However, the spirit of the present disclosure is not limited thereto.

Preparation Example: Example 1 and Comparative Examples 1 to 5

Paint compositions of Examples and Comparative Examples were prepared with compositions shown in Table 1 below.

TABLE 1

| (Unit: % by weight) | Example 1 | Comparative Example 1 | Comparative Example 2 | Comparative Example 3 | Comparative Example 4 | Comparative Example 5 |
|---|---|---|---|---|---|---|
| Acrylic resin | 8.4 | — | — | 8.4 | 8.4 | 8.4 |
| First acrylic polyol rein | 16.7 | 20.9 | 20.9 | 16.7 | 16.7 | 16.7 |
| Second acrylic polyol rein | 12.5 | 16.7 | 12.5 | 12.5 | 12.5 | 12.5 |
| Polycarbonate diol resin | 4.2 | — | 4.2 | 4.2 | 4.2 | 4.2 |
| Diisocyanate | 16.6 | 16.6 | 16.6 | 16.6 | 16.6 | 16.6 |
| Ketone-based solvent | 7.8 | 15 | 15 | 10 | 8.4 | 4.8 |
| Acetate-based solvent | 29.2 | 29.2 | 29.2 | 29.2 | 29.2 | 29.2 |
| Antibacterial agent | 3.0 | — | — | 0.8 | 2.4 | 6 |
| Curing accelerator | 0.4 | 0.4 | 0.4 | 0.4 | 0.4 | 0.4 |
| Ultraviolet stabilizer | 0.8 | 0.8 | 0.8 | 0.8 | 0.8 | 0.8 |
| Surface modifier | 0.4 | 0.4 | 0.4 | 0.4 | 0.4 | 0.4 |

An acrylic resin had a glass transition temperature (Tg) of 84° C. and has a solid content of about40% by weight.

A first acrylic polyol resin had a glass transition temperature of 63° C. and a hydroxyl value of 20% and has a solid content of about57% by weight.

A second acrylic polyol rein had a glass transition temperature of 52° C. and a hydroxyl value of 20% and has a solid content of about51% by weight.

A polycarbonate diol resin had a molecular weight (Mw) of 1000 and a hydroxyl value of 3% and has a solid content of about100% by weight and.

A Diisocyanate (hardner) has a solid content of about100% by weight and NCO of 21.8 ± 0.3%.

As a ketone-based solvent, methyl isobutyl ketone (MIK) and methyl ethyl ketone (MEK) were used.

As an acetate-based solvent, ethyl acetate, n-butyl acetate, and isobutyl acetate were used.

An antibacterial agent contained Silver (Ag) and a glass-based support and has a solid content of about40% by weight and had an average particle size of 1.3 μm.

As a curing accelerator, dibutyltin dilaurate was used.

AS an ultraviolet stabilizer, a hydroxyphenyl benzotriazole-based ultraviolet stabilizer was used.

As a surface modifier, a polyacrylic-based surface modifier was used and has a solid content of about52% by weight.

The paint composition, according to an embodiment of the present disclosure, may be a paint composition for vehicle water transfer printing.

FIG. 1 illustrates water transfer printed layer having antibacterial properties, according to an embodiment of the present disclosure. Referring to FIG. 1, water transfer printed layer 1 is composed of an antibacterial paint 10, a water transfer printed film 20, a base color paint 30, and a substrate 40. In addition, the antibacterial paint 10 includes an antibacterial agent 11.

As illustrated in FIG. 1, the paint composition having the antibacterial agents, according to the present disclosure, may be present in the outermost layer of various multilayer structures of water transfer printing, in addition to the structure illustrated in FIG. 1, and has excellent adhesion to a sublayer thereof.

The paint composition, according to the present disclosure, is used for water transfer printing as well as various methods and paint.

Experimental Example 1: Comparison of Physical Properties Depending on Composition Physical properties of the paint compositions prepared in Example 1 and Comparative Examples 1 to 4 were measured, and the results are shown in Table 2.

Evaluation Method

1. Appearance: A paint was coated on a plastic substrate, and then dried for 30 minutes at a temperature condition of 70° C. Next, cracks, pinholes, air bubbles, foreign matters, orange peel, craters and smoothness of the coated surface were evaluated with bare eyes.
2. Gloss and transparency: The degree of implementing wood-like gloss and transparency were sensibly evaluated with bare eyes.
3. Scratch resistance: A surface of a specimen prepared according to JIS K 6718 or a specimen prepared under the equivalent conditions to JIS K 6718 was scraped by 100 mm at a load of 4.9 N and a friction velocity of 100 mm/s. Then, the surface condition of the specimen was evaluated.

4. Adhesion: A tape peel test was performed, according to ISO 2409 or JIS K 5600-5-6. 100 squares with a size of 2 mm*2 mm were made by drawing perforated lines on a surface of a paint film with a cutter enough to reach a substrate. Then, a designated adhesive cellophane tape (specified in JIS Z 1522) was firmly attached to the surface of the paint film. Next, the tape was strongly pulled off at an angle of 90°, and the residual number of the squares on the paint film and the peeled form were evaluated.
5. Moisture resistance: Appearance and adhesion were examined after leaving a specimen at a temperature of 50° C. and a relative humidity of 95% for 168 hours.
6. Sunscreen resistance: An acrylic plate (50 mm*50 mm) was stacked with two sheets of white cotton cloth, applied with 0.25 g of Nivea sunscreen with SPF 47 to the entire surface, placed on a specimen, and pressed for adhesion. After being left in a thermostat at a temperature of 80±2° C. for 1 hour, the specimen was left at room temperature for about 10 minutes, washed with a neutral detergent, and then dried. Next, a tape peel test and a scratch test were performed according to ISO 2409 or JIS 5600-5-6.
7. Heat resistance: A specimen was left at a temperature of 80° C. for 300 hours, and then appearance and adhesion were examined.
8. Light resistance: A specimen was irradiated with a xenon arc lamp at a radiant exposure of 84 MJ/$m^2$ as specified in ISO 105, and then appearance and adhesion were examined.
9. Wear resistance: An abrasion head with a load of 4.9 N was wrapped around by a double-sided cotton canvas #10 (specified in JIS L 3102) with a size of 20 mm*20 mm. Then, the test was performed 10,000 times for a stroke length of 100 mm at a speed of 60 rpm.
10. Antibacterial properties: With methods and strains specified in ISO 22196, an initial bacteria reduction rate and a bacteria reduction rate after durability evaluation (moisture resistance, heat resistance, and light resistance) were evaluated.

TABLE 2

| Classification | Example 1 | Comparative Example 1 | Comparative Example 2 | Comparative Example 3 | Comparative Example 4 | Comparative Example 5 |
|---|---|---|---|---|---|---|
| Appearance | ◎ | ◎ | ◎ | ◎ | ◎ | ◎ |
| Gloss and Transparency | ◎ | ◎ | ◎ | ◎ | ◎ | ○ |
| Scratch resistance | ◎ | ◎ | ◎ | ◎ | ◎ | ◎ |
| Adhesion | ◎ | ◎ | ◎ | ◎ | ◎ | ◎ |
| Moisture resistance | ◎ | Δ | ◎ | ◎ | ◎ | ◎ |
| Sunscreen resistance | ◎ | ○ | ○ | ◎ | ◎ | ◎ |
| Heat resistance | ◎ | Δ | ◎ | ◎ | ◎ | X |
| Light resistance | ◎ | Δ | ○ | ◎ | ◎ | X |
| Wear resistance | ◎ | ◎ | ◎ | ◎ | ◎ | ◎ |
| Antibacterial property | ◎ | X | X | X | X | ◎ |

(Evaluation: ◎ = Excellent, ○ = Good, Δ = Moderate, X = Defective)

Figure 2:
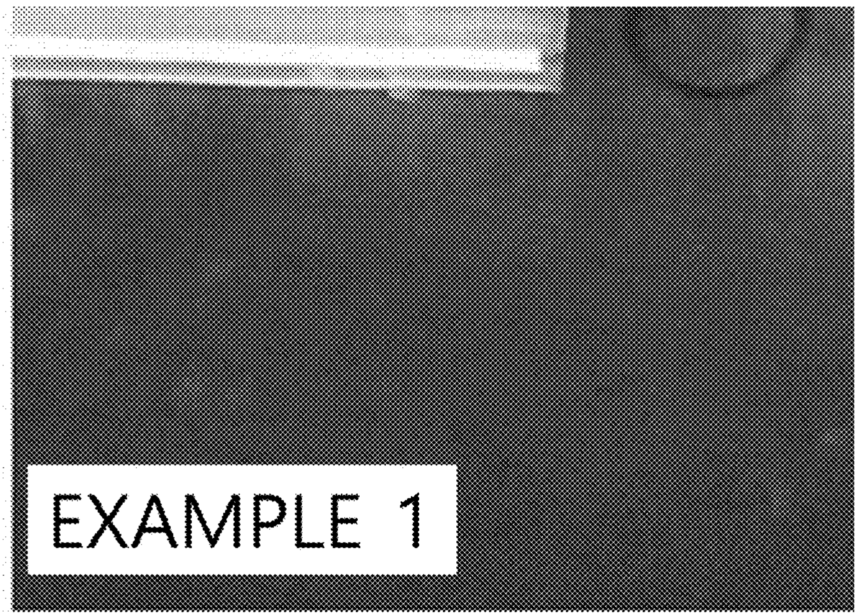
FIG. 2 is an image showing the gloss of a paint composition prepared in Example 1.

Referring to FIG. 2, the paint composition prepared in Example 1 of the present disclosure had excellent evaluation results in all physical properties. However, in the cases of paint compositions prepared in Comparative Examples, which did not satisfy the designated composition range of the present disclosure, it was confirmed that not all the physical properties were excellent.

Experimental Example 2: Comparison of Gloss Depending on Antibacterial Agent Content Gloss of each of the paint compositions prepared in Example 1 and Comparative Example 5 were measured, and the results are shown in Table 3 and FIGS. 2 and 3.

TABLE 3

| | Example 1 | Comparative Example 5 |
|---|---|---|
| Gloss (at an angle of 60°) | 91.1 | 85.5 |

Figure 3:
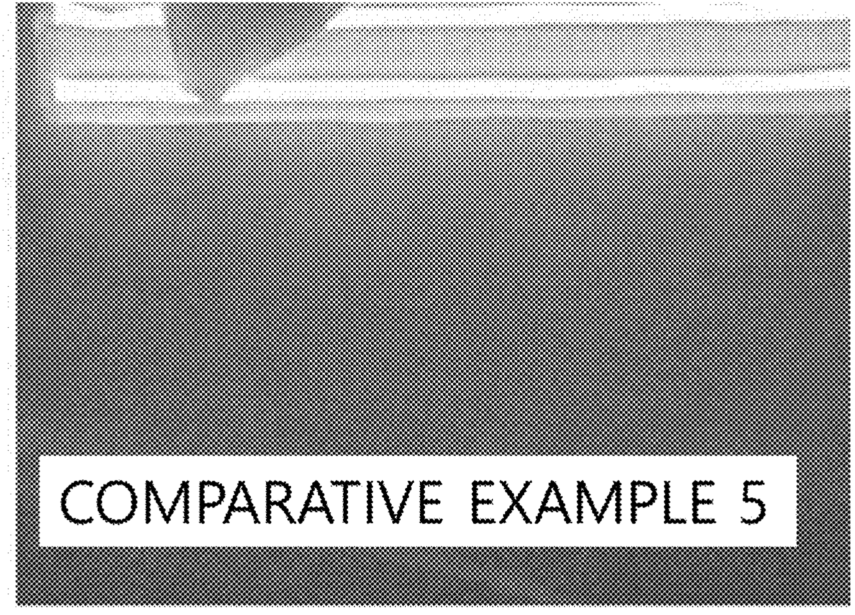
FIG. 3 is an image showing the gloss of a paint composition prepared in Comparative Example 5.

FIG. 2 is an image showing the gloss of the paint composition prepared in Example 1. In addition, FIG. 3 is an image showing the gloss of the paint composition prepared in Comparative Example 5. Referring to Table 3 and FIGS. 2 and 3, in the case of Comparative Example 5, in which the content of the antibacterial agent is 6% by weight or more, the gloss was low and haze was caused after the evaluation of light resistance and heat resistance. As a result, the overall gloss was deteriorated, and thus the paint composition prepared in Comparative Example 5 was inapplicable.

Experimental Example 3: Comparison of Bacterial Reduction Rate Depending on Antibacterial Agent Content Bacterial reduction rates (antibacterial activity value) depending on the antibacterial agent content of the paint compositions prepared in Example 1 and Comparative Example 4 were measured initially/after durability evaluation. The results are shown in Table 4.

TABLE 4

| Bacterial reduction rate depending on antibacterial agent content initially/ after durability evaluation | Example 1 | Comparative Example 4 |
|---|---|---|
| Initial | 4.6/6.3 | 1.8/1.0 |
| Light resistance | 4.7/2.9 | — |
| Heat resistance | 4.7/3.5 | — |
| Moisture resistance | 4.7/3.0 | — |

Referring to Table 4, in the case of Example 1, in which the paint composition includes 3% by weight of the antibacterial agent, it was confirmed that the initial antibacterial activity values after initial evaluation and after durability test were both excellent. On the other hand, in the case of Comparative Example 4, it was confirmed that antibacterial properties after the durability evaluation (heat resistance, light resistance and moisture-resistance), as well as the initial antibacterial properties of initial status, were insufficient.

Experimental Example 4: Comparison of Bacterial Reduction Rate Depending on Quencher Content Using the paint composition prepared in Example 1, bacterial reduction rates (antibacterial activity value) depending on a quencher content were measured. The results are shown in Table 5.

TABLE 5

| Quencher content depending on antibacterial agent content initially/ after durability evaluation | 0% (glossy) | 10% (semi-glossy) |
|---|---|---|
| Initial | 4.6/6.3 | 4.6/6.3 |
| Light resistance | 4.7/2.9 | 4.7/2.5 |
| Heat resistance | 4.7/3.5 | 4.7/2.8 |
| Moisture resistance | 4.7/3.0 | 4.7/2.4 |

Referring to FIG. 5, even when the quencher was added, the antibacterial properties of the paint composition, according to the present disclosure, was not reduced. That is, the quencher has the effects of maintaining the antibacterial properties and regulating gloss corresponding with the needs of consumers.

Therefore, the paint composition, according to the present disclosure, is prepared by mixing each of the acrylic resin, acrylic polyol resin, polycarbonate diol resin, diisocyanate, solvent, and antibacterial agent in appropriate amounts. As a result, the paint composition has excellent physical properties and effective antibacterial activities.

Although the preferred embodiments of the present disclosure have been disclosed for illustrative purposes, those skilled in the art will appreciate that various modifications, additions and substitutions are possible, without departing from the scope and spirit of the invention as disclosed in the accompanying claims. Therefore, preferred embodiments of the present disclosure have been described for illustrative purposes, and should not be construed as being restrictive.

The invention claimed is:

1. A paint composition comprising:

an amount of 1% to 10% by weight of an acrylic resin;

an amount of 20% to 50% by weight of an acrylic polyol resin;

an amount of 1% to 10% by weight of a polycarbonate diol resin;

an amount of 15% to 25% by weight of a diisocyanate;

an amount of 21% to 60% by weight of a solvent; and an amount of 2% to 5% by weight of an antibacterial agent.

2. The paint composition of claim 1, wherein the acrylic resin has a solid content of about 35% to 45% by weight and has a glass transition temperature (Tg) in a range of about 50° C. to 90° C.

3. The paint composition of claim 1, wherein the acrylic polyol resin comprises:

an amount of 10% to 25% by weight of a first acrylic polyol resin; and an amount of 10% to 25% by weight of a second acrylic polyol resin with respect to 100% by weight of the entire paint composition.

4. The paint composition of claim 3, wherein the first acrylic polyol resin has a solid content of about 55% to 65% by weight and has a hydroxyl value in a range of about 15% to 60% and a glass transition temperature (Tg) in a range of about 30° C. to 70° C.

5. The paint composition of claim 3, wherein the second acrylic polyol resin has a solid content of about 45% to 55% by weight and has a hydroxyl value in a range of about 10% to 50% and a glass transition temperature (Tg) in a range of about 20° C. to 60° C.

6. The paint composition of claim 1, wherein the polycarbonate diol resin has a solid content of about 90% to 100% by weight and has a hydroxyl value in a range of about 1% to 10% and a weight average molecular weight (Mw) in a range of about 100 to 2000.

7. The paint composition of claim 1, wherein the diisocyanate has a solid content of about 90% to 100% by weight and NCO in a range of about 15% to 25%.

8. The paint composition of claim 1, wherein the solvent comprises at least one selected from the group consisting of: a ketone-based solvent, an acetate-based solvent, and combinations thereof.

9. The paint composition of claim 8, wherein the paint composition comprises:

an amount of 1% to 10% by weight of the ketone-based solvent; and an amount of 20% to 50% by weight of the acetate-based solvent, with respect to the total weight of the entire paint composition.

10. The paint composition of claim 1, wherein the antibacterial agent comprises an inorganic antibacterial agent.

11. The paint composition of claim 1, wherein the antibacterial agent comprises at least one metal selected from the group consisting of: magnesium (Mg), zinc (Zn), silver (Ag), calcium (Ca), phosphorus (P), lead (Pb), and combinations thereof.

12. The paint composition of claim 1, wherein the antibacterial agent comprises a support and a metal supported on the support, and the metal is silver (Ag), and the support comprises at least one type selected from the group consisting of: a glass-based support, a zeolite-based support, a zirconium-based support, and combinations thereof.

13. The paint composition of claim 12, wherein the antibacterial agent comprises an amount of 0.01% to 5% by weight of silver (Ag) with respect to a total weight of the entire antibacterial agent.

14. The paint composition of claim 1, wherein the antibacterial agent has a solid content of about 30% to 50% by weight.

15. The paint composition of claim 1, wherein the antibacterial agent has an average particle size in a range of about 1.1 μm to 1.5 μm.

16. The paint composition of claim 1, further comprising an additive selected from the group consisting of: a curing accelerator, an ultraviolet stabilizer, a surface modifier, and combinations thereof.

17. The paint composition of claim 16, wherein the additive comprises:

an amount of 0.1% to 1% by weight of the curing accelerator;

an amount of 0.1% to 3% by weight of the ultraviolet stabilizer; and an amount of 0.1% to 1% by weight of the surface modifier, with respect to 100% by weight of the entire paint composition.

18. The paint composition of claim 1, further comprising a quencher.

19. The paint composition of claim 18, wherein the quencher comprises synthetic amorphous silica having an average particle size in a range of about 1.0 μm to 2.0 μm.

* * * * *